April 27, 1948. V. A. RAYBURN 2,440,487
CORROSION RESISTANT FILTER
Filed Sept. 4, 1943 2 Sheets-Sheet 1

INVENTOR.
V. A. RAYBURN
BY
ATTORNEY

April 27, 1948.  V. A. RAYBURN  2,440,487
CORROSION RESISTANT FILTER
Filed Sept. 4, 1943  2 Sheets-Sheet 2
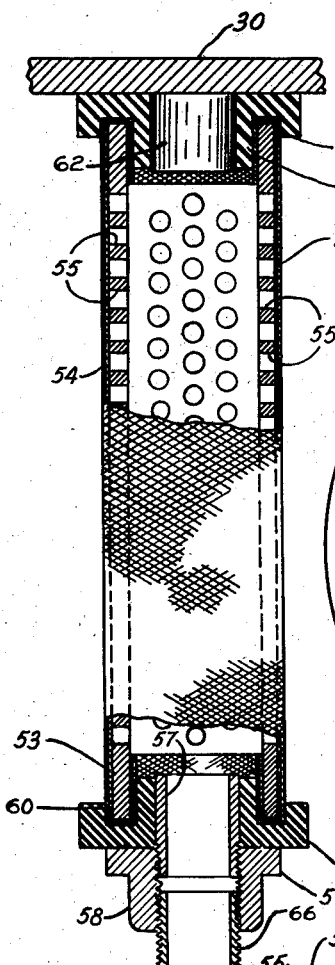
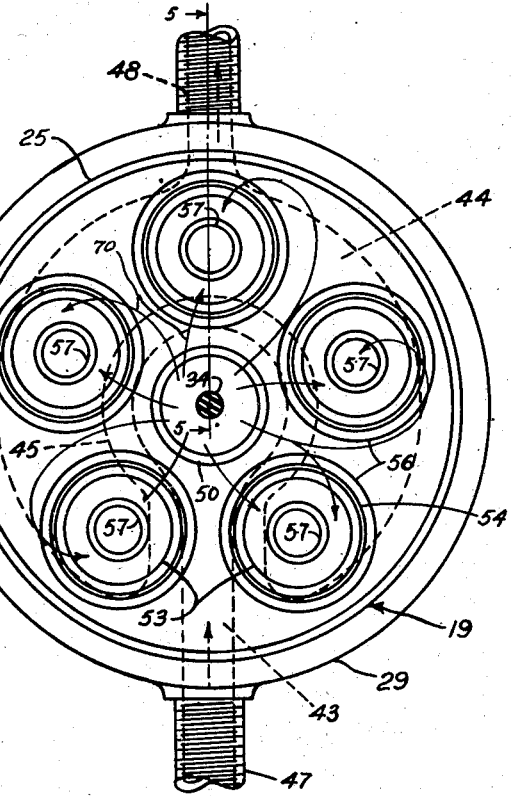
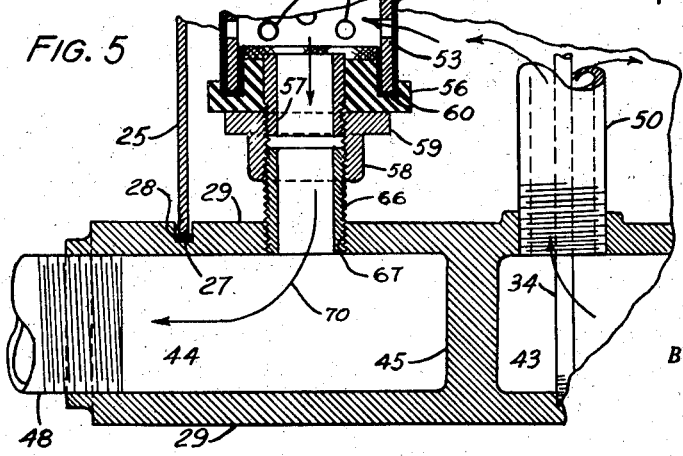
INVENTOR.
V. A. RAYBURN
BY
ATTORNEY Patented Apr. 27, 1948

2,440,487

UNITED STATES PATENT OFFICE 2,440,487

CORROSION RESISTANT FILTER

Vincent A. Rayburn, Baltimore, Md., assignor to Western Electric Company, Incorporated, New York, N. Y., a corporation of New York Application September 4, 1943, Serial No. 501,235

2 Claims. (Cl. 210—184)

This invention pertains to filters and more particularly to filters for filtering fluids used as electrolytes in electroplating and electrocleaning processes.

In the processes of electroplating and electrocleaning of metal surfaces, the use of a continuous method is preferable. The electrolytes employed for such duty are subject to contamination from external and internal conditions. They collect dirt, dust and other particles from the atmosphere and from the objects being processed. Also, chemical reactions which occur in these processes produce precipitates, sludges, and the like. All these contaminate the electrolytes, increase the periods of time required to do work, increase the internal resistance, affect the finish of the products, and make the equipment subject to damage and stoppage. To remedy such conditions, one conventional method is to filter the electrolyte. However, no satisfactory continuous filter for use with corrosive electrolytes, such as fluosilicic acid baths, had been known prior to this invention.

It is the object of this invention to provide new and useful filters, and particularly to provide filters suitable for use with corrosive electrolytes.

In accordance with this invention, the electrolytes are passed through a filter having a plurality of perforated tubes having comparatively large surfaces and covered with a suitable filtering fabric. The filter is made up as a unit which includes a chamber, an inlet pipe for introducing a contaminated liquid into the chamber, a plurality of filter elements comprising foraminous tubes, made of hard rubber or similar material, positioned in the chamber, textile strainers, made of wool or other suitable material, surrounding the tubes, and means for conveying purified liquid from the interior of the tubes out of the unit.

The invention will be fully understood from the following detailed description of one embodiment thereof, taken in conjunction with the accompanying drawings, in which:

Fig. 3 is a plan view of the filter shown in Fig. 2 with the cover removed.

Fig. 4 is an elevation of a filter element forming a part of the filter, with portions broken away and in section to show its structure, and Fig. 5 is a fragmentary sectional view taken on line 5—5 of Fig. 3.

Figure 1:
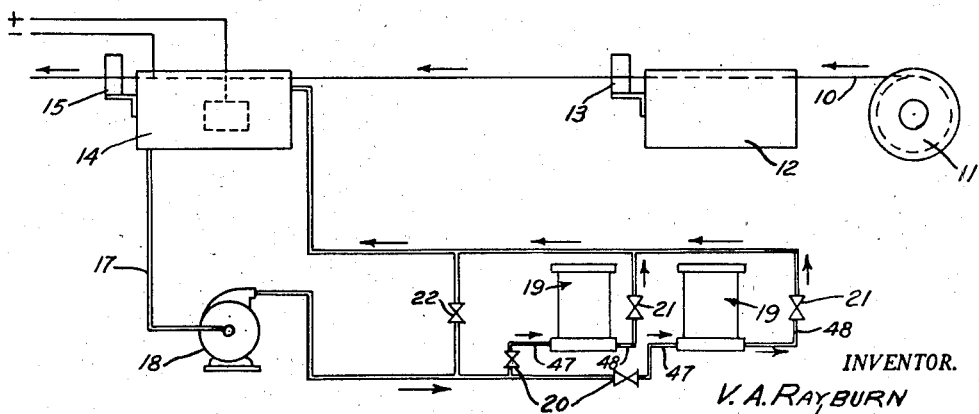
Fig. 1 is a diagrammatic view of a system employing a filter embodying this invention.

Referring now to the drawings, in which similar reference characters refer to similar parts throughout the several views, the manner of employing the filter unit is indicated in the diagram outlined in Fig. 1, in which the numeral 10 indicates a bronze wire to be cleaned and plated. The wire 10 is passed from a supply reel 11 through a washing tank 12, employing water as the cleaning medium, and through a wiper 13. The wiper removes the water and dirt as the wires travel to a plating tank 14 which contains an electrolyte of lead fluosilicate and free fluosilicic acid, and in which the wire is lead plated in a conventional manner. A wiper 15 removes the electrolyte from the wire after it is plated and before the wire is advanced to the next step in the processes of making the wire product.

The electrolyte in the plating tank 14 is drawn from the tank through piping 17 and is circulated by a pump 18 through one of a plurality of filters 19—19. Suitable valves 20—20 and 21—21 control the flow of the electrolyte through the filters and permit the filters to be used alternately or simultaneously. A by-pass valve 22 is provided for use when it is desired to keep the filters out of operation.

Each of the filters 19—19 comprises a vertical, cylindrical casing 25 made of brass or other suitable material resistant to corrosion by the electrolyte to be filtered. The casing 25 rests upon a gasket 27 positioned in the bottom of a circular groove 28 formed in a base member 29. The top of the casing 25 is closed by means of a cover 30 which is also provided with a circular groove 31 which fits over the upper edge of the casing 25. A gasket 33 is positioned in the groove 31 between the edge of the casing 25 and the cover to provide a tight seal therebetween. A tie rod 34 projects upwardly from the bottom of the base member 29 and extends through an opening 35 in the cover 30. The cover 30 is provided with a socket 36 in which is positioned a gasket 38 and a washer 40 against which a nut 39, threaded on the end of the tie rod 34, presses to effect a liquid tight seal around the upper end of the tie rod 34.

The base member 29 is provided with two chambers 43 and 44 which are separated by a wall 45. One of inlet pipes 47—47, leading from the valves 20—20, is connected to the chamber 43, and one of pipes 48—48, leading back to the plating tank 14 in the system shown in Fig. 1, is connected to the chamber 44. Connected with the chamber 43 is a vertical pipe 50 which is disposed centrally of the casing 25 and surrounds the tie rod 34. The pipe 50 serves as an inlet for the electrolyte entering the casing and insures an equal distribution of the electrolyte introduced therein.

Surrounding the pipe 50 are a plurality of filter elements 52—52, each of which comprises a tube 53, preferably made of an inert material such as hard rubber, over which is stretched a woven fabric strainer 54, preferably made of wool or other material that is unaffected by the electrolyte. The tube 53 is provided with offset rows of perforations 55—55 to permit the electrolyte being filtered to pass through the strainer 54 into the interior of the tube. Each tube 53 rests upon a soft rubber gasket 56 which surrounds a nipple 57, projecting from a coupling 58, and engages a flange 59 formed on the coupling 58. The gasket 56 is provided with a circular groove 60 in which the lower end of the tube 53 rests. The lower end of the fabric strainer 54 is carried downwardly beneath the lower end of the tube 53 and is then brought upwardly within the tube 53, as clearly shown in Fig. 4 of the drawings, to insure that no electrolyte passes into the interior of the tube without first passing through the fabric strainer 54.

One of a plurality of bosses 62—62 projecting from the lower side of the cover 30 extends into each tube 53, and each boss is surrounded by a rubber gasket 63, which is identical in construction with the gasket 56. The gasket 63 is provided with a circular groove 64 into which the upper ends of the tube 53 and the strainer 54 extend, in a manner similar to that described with reference to the groove 60 in the gasket 56.

When the nut 39 is tightened, pressure is exerted upon the cover 30 which is transmitted through all the elements to the base member 29. This pressure causes the gaskets 27, 33, 38, 56—56 and 63—63 to effect liquid tight seals between the respective elements adjacent thereto. The coupling 58 is internally threaded and is screwed upon a nipple 66 threaded into an opening 67 in the base member 29, so as to connect the interior of the tube 53 with the chamber 44. At the same time, this construction permits vertical adjustment of the coupling 58 to a position where a tight joint between the tube 53 and the gasket 56 is insured. A plug 68 (Fig. 2) is provided in the bottom of the chamber 44 to provide access to the interior thereof for draining and cleaning the chamber. If desired, the chamber 44 may be connected in a conventional manner to a water line through a suitable valve to flush out the chamber.

Figure 2:
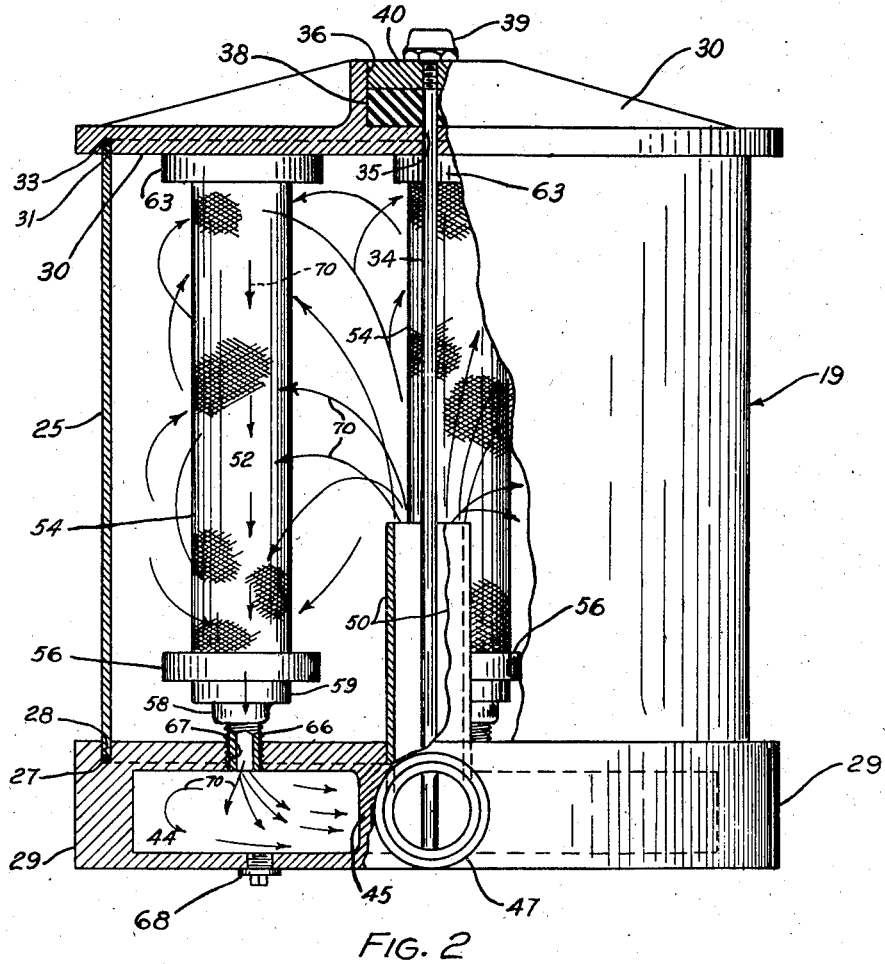
Fig. 2 is an elevation of the filter with portions thereof broken away and in section to indicate the construction thereof.

The operation of the apparatus is as follows: With the several elements of one of the filters assembled, as shown in Fig. 2 of the drawings, the electrolyte drawn from the plating tank 14 is circulated through the filter by the force of the pump 18. The electrolyte enters the chamber 43 through the pipe 47 and passes upwardly into the interior of the casing 25 through the inlet pipe 50. The electrolyte fills the interior of the casing 25 and passes through the filter elements 52—52 from the exterior to the interior thereof, as indicated by the arrows 70—70 in the drawings, and in such passage extraneous matter carried by the electrolyte is removed by the fabric strainers 54—54. The filtered electrolyte then passes downwardly within the tubes 53—53, and is conveyed by the nipples 66—66 to the interior of the chamber 44, from whence it leaves the filter through the pipe 48 and is conveyed back to the plating tank 14.

Preferably the filters are used alternately and when the strainers 54—54 in the filter in use become clogged, the valve 20 leading to that respective filter is closed. The corresponding valve leading to the other filter is opened, and the filtering is then performed by the other filter. The nut 39 on the filter out of service is withdrawn from the end of the tie rod 34, the cover 30 is removed from the casing 25, and the strainers 54—54 are either scraped free of the matter collected thereon and washed, or are replaced by new strainers. The apparatus is then reassembled and is ready for further use.

The provision of the pipe 50 prevents the electrolyte entering the filter from travelling directly to the lowermost portions of the filter elements 52—52 and from leaving a stagnant body of electrolyte in the upper portion of the filter. Although the cross sectional area of the pipe 50 is relatively small, as compared with the surface area of the strainers 54—54, and the rate of flow of the electrolyte through the individual filter elements is relatively slow, there is ample filtering area to permit the filtering operation to proceed rapidly and the electrolyte to be thoroughly filtered. There is sufficient space between the filter elements themselves and between these elements and the casing to permit free access to the entire filtering surfaces of the strainers 54—54.

One of the important features of the invention is the ease with which the apparatus may be dismantled, cleaned and reassembled. All that is required to dismantle the apparatus is to remove the nut 39 and to take off the cover 30. The filter elements are then readily accessible and may be easily lifted out for cleaning or replacement. The tubes 53—53 and the strainers 54—54 are symmetrical and may be used with either end up. Likewise, the gaskets 56—56 and 63—63 are of identical construction. It is also immaterial which end of the casing 25 rests upon the base member 29, since the groove 28 in the base member 29 and the groove 31 in the cover 30 are identical and the casing is annular.

All of these features add to the flexibility of the apparatus and permit the parts to be manufactured economically. This construction also reduces the possibilities of errors arising through misplacement of the several parts, and greatly decreases the time required to dismantle and assemble the device.

It has been found that when fabric strainers made of wool are used in filters of the type described hereinabove, they will give long service even when used with such corrosive materials as fluosilicic acid. However, it is obvious that the strainers may be made of other fabrics which will withstand the action of the electrolyte which it is desired to have filtered. The hard rubber tubes also withstand the corrosive effects of fluosilicic acid, but they may be replaced with tubes made of other non-reactive material, such as "Bakelite." All the metal parts of the filter preferably are made of brass, since this material is substantially unaffected by fluosilicic acid. However, it is obvious that, if other electrolytes are employed, the metallic parts may be made of other metals, such, for example, as iron. Various other modifications may be made in these filters without departing from the scope of the invention.

What is claimed is:

1. A filter, which comprises a base member having separate inlet and outlet chambers formed therein, an annular casing positioned on the base member, a cover for the casing means for conveying a liquid to be filtered from the inlet chamber in the base member to substantially the middle portion of the casing, a plurality of threaded couplings, a plurality of threaded pipes secured to the base member in positions equidistant from the center of the casing for adjustably connecting the couplings with the outlet chamber, resilient rubber gaskets carried by the coupling members, a plurality of perforated hard rubber tubes each having one end thereof positioned upon one of the gaskets, a plurality of resilient rubber gaskets carried by the cover so as to engage the ends of the tubes, a plurality of tubular, wool fabric strainers each surrounding the exterior surface and the ends of one of the tubes, and means for exerting pressure on the cover, whereby the gaskets are forced into close engagement with the strainers and the tubes and liquid tight seals are effected between the tubes and the couplings and the cover, respectively.

2. A filter, which comprises a base member having separate inlet and outlet chambers formed therein, a casing member positioned on the case member, a cover for the casing, means for conveying a liquid to be filtered from the inlet chamber in the base member to substantially the middle portion of the casing, a plurality of threaded couplings, a plurality of threaded pipes secured to the base member for adjustably connecting the couplings with the outlet chamber, a plurality of resilient gaskets carried by the couplings, a plurality of tubular filter elements each having one end thereof positioned on one of the gaskets, a plurality of resilient gaskets carried by the cover so that each gasket engages the opposite end of one of the tubular filter elements, and means for exerting pressure on the cover, whereby the gaskets are forced into close engagement with the tubular filter elements and liquid tight seals are effected between the tubular filter elements and the couplings and the cover, respectively.

VINCENT A. RAYBURN.

REFERENCES CITED

The following references are of record in the file of this patent:

UNITED STATES PATENTS

| Number | Name | Date |
|---|---|---|
| 401,930 | Cooper et al. | Apr. 23, 1889 |
| 420,136 | Willis | Jan. 28, 1890 |
| 519,664 | Chamberland | May 8, 1894 |
| 648,043 | Miles | Apr. 24, 1900 |
| 680,902 | Weaver | Aug. 20, 1901 |
| 796,519 | Kneuper | Aug. 8, 1905 |
| 817,252 | Kneuper | Apr. 10, 1906 |
| 832,469 | Fleuss | Oct. 2, 1906 |
| 1,000,405 | Healey | Aug. 15, 1911 |
| 1,148,237 | Kneuper | July 27, 1915 |
| 1,663,298 | Geer et al. | Mar. 20, 1928 |
| 1,698,204 | Stiehm | Jan. 8, 1929 |
| 1,751,000 | Goldman | Mar. 18, 1930 |
| 2,027,681 | Durant et al. | Jan. 14, 1936 |
| 2,161,766 | Rugeley | June 6, 1939 |
| 2,357,943 | Feagley et al. | Sept. 12, 1944 |

FOREIGN PATENTS

| Number | Country | Date |
|---|---|---|
| 5,322 | Great Britain | 1911 |
| 9,033 | Great Britain | 1897 |
| 17,190 | Great Britain | 1906 |
| 343,148 | France | July 28, 1904 |